US011407297B2

United States Patent
Hsiao

(10) Patent No.: US 11,407,297 B2
(45) Date of Patent: Aug. 9, 2022

(54) IMPACT ENERGY ABSORBING CARRIER AND IMPACT ENERGY ABSORBING MEMBER

(71) Applicants: Inventec (Pudong) Technology Corporation, Shanghai (CN); INVENTEC CORPORATION, Taipei (TW)

(72) Inventor: Chi-Cheng Hsiao, Taipei (TW)

(73) Assignees: INVENTEC (PUDONG) TECHNOLOGY CORPORATION, Shanghai (CN); INVENTEC CORPORATION, Taipei (TW)

( * ) Notice: Subject to any disclaimer, the term of this patent is extended or adjusted under 35 U.S.C. 154(b) by 99 days.

(21) Appl. No.: 17/113,313

(22) Filed: Dec. 7, 2020

(65) Prior Publication Data

US 2022/0072942 A1 Mar. 10, 2022

(30) Foreign Application Priority Data

Sep. 7, 2020 (CN) .......................... 202010927341.9

(51) Int. Cl.
*B60J 7/00* (2006.01)
*B60K 1/04* (2019.01)
*B62D 21/15* (2006.01)

(52) U.S. Cl.
CPC ................ *B60K 1/04* (2013.01); *B62D 21/15* (2013.01); *B60K 2001/0438* (2013.01)

(58) Field of Classification Search
CPC ......... B60R 19/18; B60R 19/34; B60R 21/04; B62D 1/195; B62D 1/184; B62D 1/192; F16F 7/123
See application file for complete search history.

(56) References Cited

U.S. PATENT DOCUMENTS

| 9,499,205 | B1 * | 11/2016 | Elia ........................... B60K 6/28 |
| 10,651,440 | B1 * | 5/2020 | Khan ..................... B60R 16/04 |
| 2013/0088045 | A1 * | 4/2013 | Charbonneau ..... B62D 25/2036 296/187.12 |
| 2018/0194213 | A1 * | 7/2018 | Kobayashi ............ H01M 50/20 |
| 2018/0312197 | A1 * | 11/2018 | Takahashi ................ B60K 1/04 |
| 2018/0337374 | A1 * | 11/2018 | Matecki .................. B60K 1/04 |
| 2019/0081298 | A1 * | 3/2019 | Matecki ............... B60R 19/023 |
| 2019/0237724 | A1 * | 8/2019 | Kawaguchi ............. B60L 50/66 |

(Continued)

*Primary Examiner* — Kiran B Patel
(74) *Attorney, Agent, or Firm* — Locke Lord LLP; Tim Tingkang Xia, Esq.

(57) ABSTRACT

The invention provides an impact energy absorbing carrier including a frame, a carrier, and multiple impact energy absorbing units. Each of the impact energy absorbing units includes a first link, a second link, and an impact energy absorbing member. The first link and the second link are respectively fixed to the frame and the carrier. The impact energy absorbing member includes a periphery part and two protrusion parts. The periphery part includes a first side portion and a second side portion located opposite to each other. The first side portion of the periphery part are respectively and pivotably disposed on the first link and the second link. The periphery part surrounds the protrusion parts, the protrusion parts are respectively connected to the first side portion and the second side portion of the periphery part, and a first buffering space is located between the protrusion parts.

10 Claims, 4 Drawing Sheets

(56) References Cited

U.S. PATENT DOCUMENTS

| | | | |
|---|---|---|---|
| 2021/0078638 A1* | 3/2021 | Hirota | B62D 21/157 |
| 2021/0284243 A1* | 9/2021 | Takahashi | B62D 21/157 |
| 2021/0387672 A1* | 12/2021 | Choi | B62D 25/2036 |
| 2022/0059892 A1* | 2/2022 | Matecki | B60L 50/66 |

\* cited by examiner

IMPACT ENERGY ABSORBING CARRIER AND IMPACT ENERGY ABSORBING MEMBER

CROSS-REFERENCE TO RELATED APPLICATIONS

This non-provisional application claims priority under 35 U.S.C. § 119(a) on Patent Application No(s). 202010927341.9 filed in China on Sep. 7, 2020, the entire contents of which are hereby incorporated by reference.

TECHNICAL FIELD OF THE INVENTION

The invention relates to an impact energy absorbing carrier and an impact energy absorbing member, more particularly to an impact energy absorbing carrier and an impact energy absorbing member applied to an electric vehicle.

DESCRIPTION OF THE RELATED ART

Years ago, most the motor vehicles, such as motorcycles, are powered by diesel and petrol engines, but it is known that engines produce serious air and noise pollutions. Thus, electric vehicles have been widely accepted as a solution to these pollutions since the electric vehicles run on electricity generated from batteries and do not emit air pollutants. With the development of electric power technology, electric motor systems have become more delicate to provide precise motion control. And it is necessary to avoid or against an impact or vibration to ensure the functionality of the system, Potting is the most common way for the battery system against impact and vibration. It is a process of filling a battery housing with a gelatinous compound for resistance to shock and vibration and for the exclusion of water moisture, or corrosive agents. However, potting leads to very inconvenience for battery maintenance because the removal of the gelatinous compound encapsulating the battery cells is troublesome. Replacing the whole with a new one usually is the most feasible solution. As discussed, it is desired to find a balance between impact energy absorbing and the facilitation of maintenance.

SUMMARY OF THE INVENTION

The disclosure provides an impact energy absorbing carrier and an impact energy absorbing member that are capable of absorbing impact and vibrations and facilitating the maintenance.

One embodiment of the invention provides an impact energy absorbing carrier configured for accommodating a battery. The impact energy absorbing carrier includes a frame, a container, and a plurality of impact energy absorbing units. The container is configured for accommodating the battery. The container is mounted on the frame via the impact energy absorbing units. Each of the impact energy absorbing units including a first link, a second link, and an impact energy absorbing member. An end of the first link is fixed to the frame. An end of the second link is fixed to the container. The impact energy absorbing member includes a periphery part and two protrusion parts. The periphery part includes a first side portion and a second side portion located opposite to each other. The first side portion of the periphery part is pivotably disposed on the first link, and the second side portion of the periphery part is pivotably disposed on the second link. The periphery part surrounds the two protrusion parts, the two protrusion parts are respectively connected to the first side portion and the second side portion of the periphery part, and a first buffering space is located between the two protrusion parts.

Another embodiment of the invention provides an impact energy absorbing member. The impact energy absorbing member includes a periphery part and two protrusion parts. The periphery part includes a first side portion and a second side portion located opposite to each other. The periphery part surrounds the two protrusion parts, the two protrusion parts are respectively connected to the first side portion and the second side portion of the periphery part, and a first buffering space is located between the two protrusion parts.

According to the impact energy absorbing carrier and the impact energy absorbing member as discussed above, the material and the structure of the impact energy absorbing member can provide a comprehensive cushioning against impact and vibration in a large range of frequency.

In addition, the impact energy absorbing unit is detachable from the frame and the container, such that the container and the battery placed thereon can be removed from the impact energy absorbing unit, thereby facilitating the maintenance and the reuse of the battery and thus meeting the eco-friendly requirement.

BRIEF DESCRIPTION OF THE DRAWINGS

The present invention will become better understood from the detailed description given herein below and the accompanying drawings which are given by way of illustration only and thus are not intending to limit the present invention and wherein.

DETAILED DESCRIPTION

Figure 1:
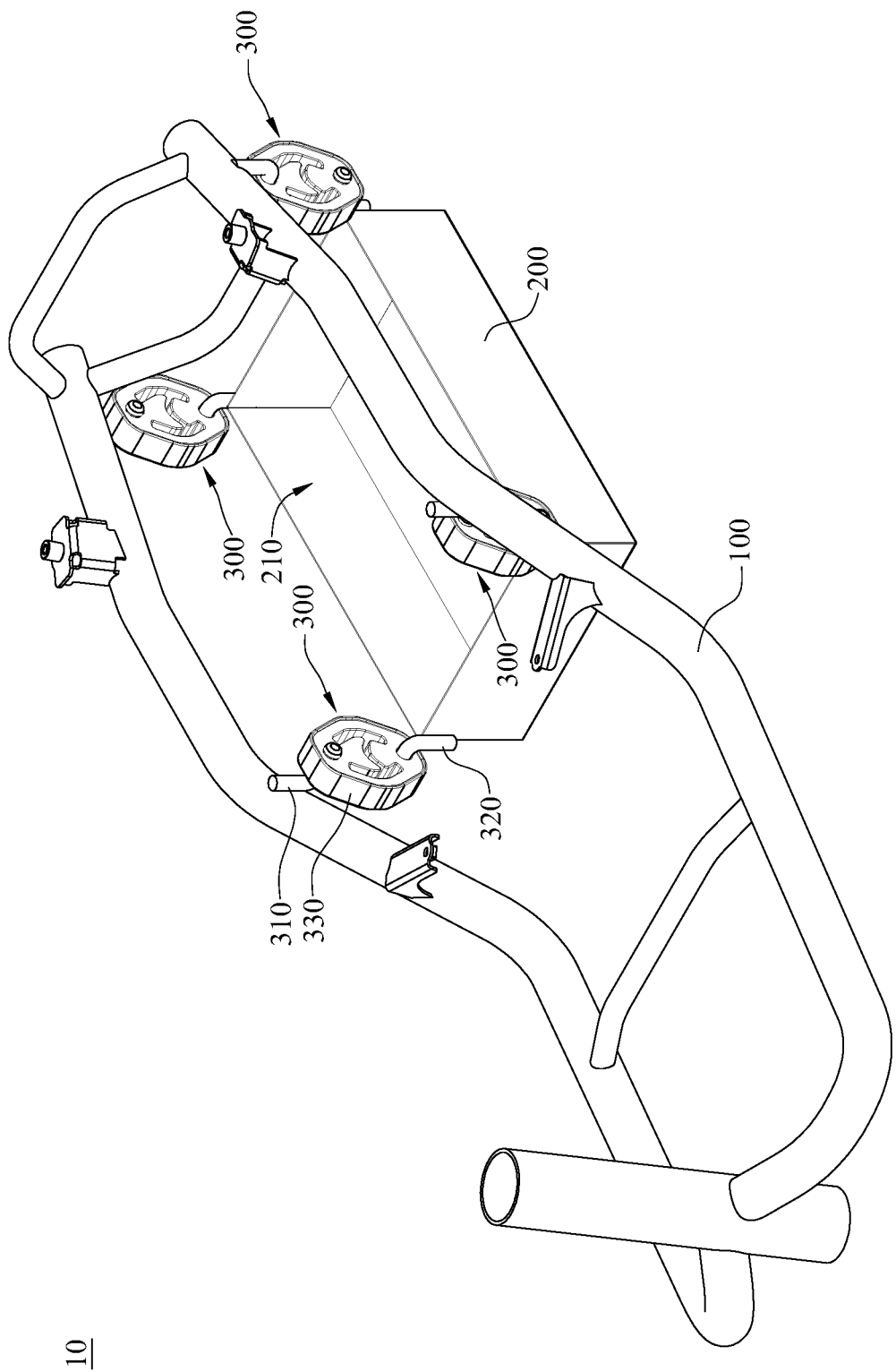
FIG. 1 is a perspective view of an impact energy absorbing carrier according to one embodiment of the invention.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

In addition, the following embodiments are disclosed by the figures, and some practical details are described in the following paragraphs, but the present invention is not limited thereto. Furthermore, for the purpose of illustration, some of the structures and components in the figures are simplified, and wires, reference lines or buses are omitted in some of the figures.

Moreover, the terms used in the present invention, such as technical and scientific terms, have its own meanings and can be comprehended by those skilled in the art, unless the terms are additionally defined in the present invention. That is, the terms used in the following paragraphs should be read on the meaning commonly used in the related fields and will not be overly explained, unless the terms have a specific meaning in the present invention.

Figure 2:
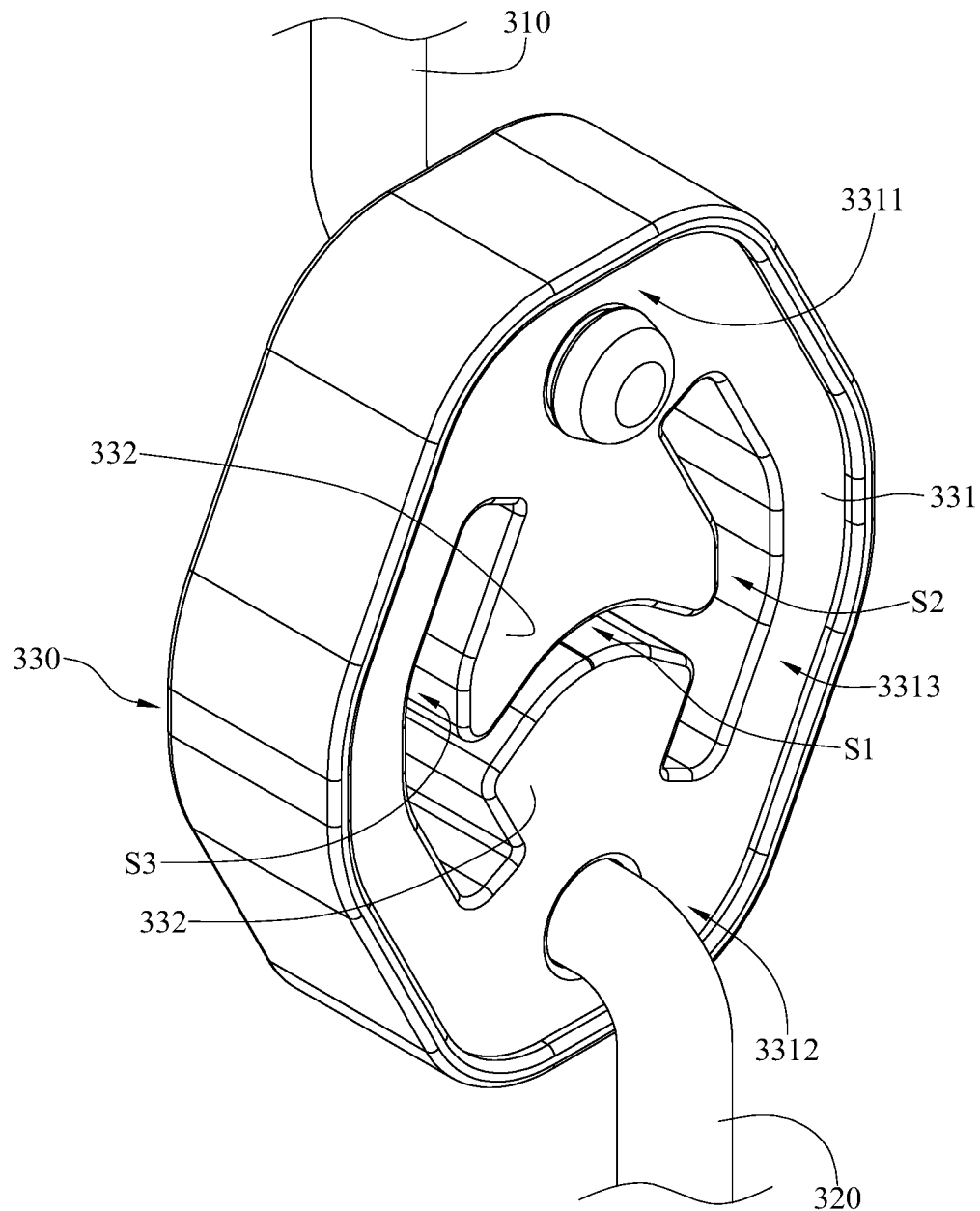
FIG. 2 is a perspective view of an impact energy absorbing unit of the impact energy absorbing carrier in FIG. 1.
Figure 3:
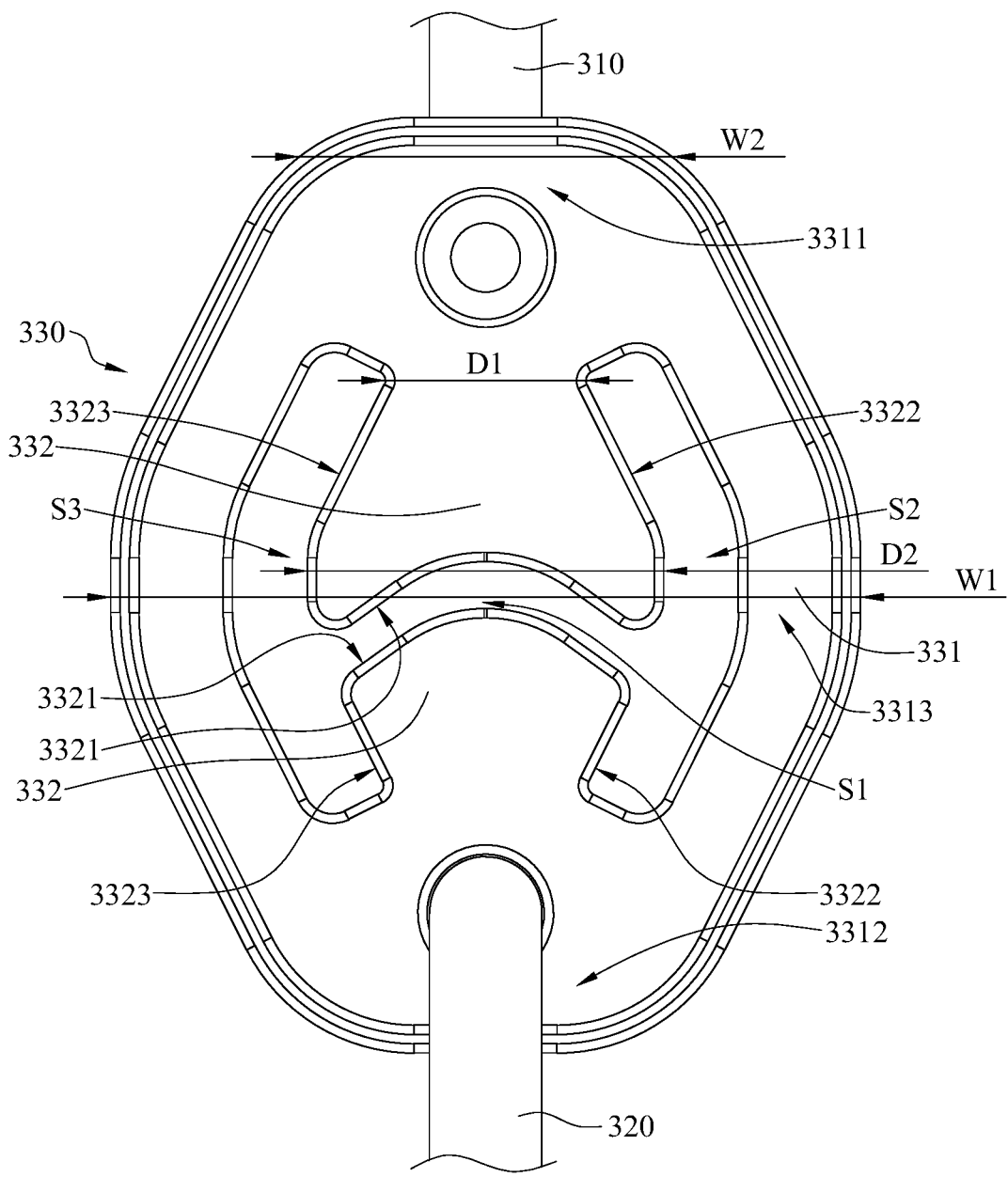
FIG. 3 is a planar view of the impact energy absorbing unit in FIG. 2.

Referring to FIGS. 1 to 3, there are shown a perspective view of an impact energy absorbing carrier 10 according to one embodiment of the invention, a perspective view of an impact energy absorbing unit 300 of the impact energy absorbing carrier in FIG. 1, and a planar of the impact energy absorbing unit 300 in FIG. 2.

In this embodiment, the impact energy absorbing carrier 10 is configured for a placement of a battery (not shown). That is, in some embodiments, the impact energy absorbing carrier 10 can be taken as a battery carrier. Specifically, the impact energy absorbing carrier 10 includes a frame 100, a container 200, and a plurality of impact energy absorbing units 300. The frame 100 is made of, for example, metal. The frame 100 can be served as a motorcycle frame. The container 200 includes an accommodation space 210. The accommodation space 210 is configured for accommodating the battery. The container 200 is made of, for example, metal. The container 200 is mounted on the frame 100 via the impact energy absorbing units 300. As shown, the impact energy absorbing units 300 are respectively arranged at different sides of the container 200 to provide stable support for the container 200 on the frame 100.

In detail, each of the impact energy absorbing unit 300 includes a first link 310, a second link 320, and an impact energy absorbing member 330. The first link 310 and the second link 320 are, for example, metal poles in a shape that suitable for them to be connected to the frame 100. As shown, one end of the first link 310 is fixed to the frame 100, the other end of the first link 310 is fixed to the impact energy absorbing member 330, one end of the second link 320 is fixed to the container 200, and the other end of the second link 320 is fixed to the impact energy absorbing member 330, such that the impact energy absorbing member 330 is connected to and located between the first link 310 and the second link 320. As such, the container 200 is fixed to the frame 100 via the impact energy absorbing units 300.

The impact energy absorbing member 330 is made of, for example, rubber or thermoplastic polyurethanes. The impact energy absorbing member 330 includes a periphery part 331 and two protrusion parts 332. The periphery part 331 includes a first side portion 3311 and a second side portion 3312 located opposite to each other. The periphery part 331 further includes a middle portion 3313 connected to and located between the first side portion 3311 and the second side portion 3312. The middle portion 3313 has a width W1, the first side portion 3311 and the second side portion 3312 of the periphery part 331 each have a width W2, where the width W2 is smaller than the width W1. This width difference makes the periphery part 331 easier to deform when being compressed by external force, such as vibration and sudden impact, and the detail of which will be introduced in later paragraphs. The first side portion 3311 of the periphery part 331 is, for example, pivotably disposed on the first link 310, such that the first side portion 3311 of the periphery part 331 is movable with respect to the frame 100 via the first link 310. The second side portion 3312 of the periphery part 331 is, for example, pivotably disposed on the second link 320, such that the second side portion 3312 of the periphery part 331 is movable with respect to the container 200 via the second link 320.

The periphery part 331 surrounds the protrusion parts 332. The protrusion parts 332 are respectively connected to the first side portion 3311 and the second side portion 3312 of the periphery part 331, and protrude inwards respectively from the first side portion 3311 and the second side portion 3312. Each of the protrusion parts 332 includes a first surface 3321. The first surfaces 3321 face each other and are spaced apart from each other, such that a first buffering space S1 is formed between the first surfaces 3321. The first surfaces 3321 are curved surfaces mating with each other, such that the first buffering space S1 is in a curved shape (e.g., an arch shape as shown in FIG. 2). The first buffering space S1 creates a room for the movement of the protrusion parts 332 and the deformation of the impact energy absorbing member 330. While an impact is applied on the impact energy absorbing member 330, the impact energy absorbing member 330 may be compressed to cause the protrusion parts 332 to come towards each other, in such a case, the protrusion parts 332 may contact each other to eliminate the first buffering space S1. As the increase of the impact to compress the impact energy absorbing member 330, the protrusion parts 332 will be further deformed to increase their contact area. The above movement and deformation of the protrusion parts 332 can absorb and decrease the force delivered to the container 200 and the battery in the container 200.

In this embodiment, each of the protrusion parts 332 further includes a second surface 3322 and a third surface 3323 located opposite to each other. In each of the protrusion parts 332, the fixed end (or the root) of the protrusion part 332 has a width of D1, as shown, the width D1 is measured between the second surface 3322 and the third surface 3323; and the free end (or the distal end) of the protrusion part 332 has a width of D2, as shown, the width D2 is also measured between the second surface 3322 and the third surface 3323, and the width D1 is smaller than the distance D2. That is, each protrusion part 332 tapers towards the first side portion 3311 (or the second side portion 3312) of the periphery part 331. In other words, the portion of the protrusion part 332 that are connected to the first side portion 3311 (or the second side portion 3312) of the periphery part 331 are narrower than another portion of the protrusion part 332 located away from the first side portion 3311 (or the second side portion 3312) of the periphery part 331. In addition, the second surfaces 3322 of the protrusion parts 332 are spaced apart from the periphery part 331 so as to form a second buffering space S2 therebetween. The third surfaces 3323 of the protrusion parts 332 are spaced apart from the periphery part 331 so as to form a third buffering space S3 therebetween. The second buffering space S2 and the third buffering space S3 both are in a curved shape (e.g., an arch shape).

Figure 4:
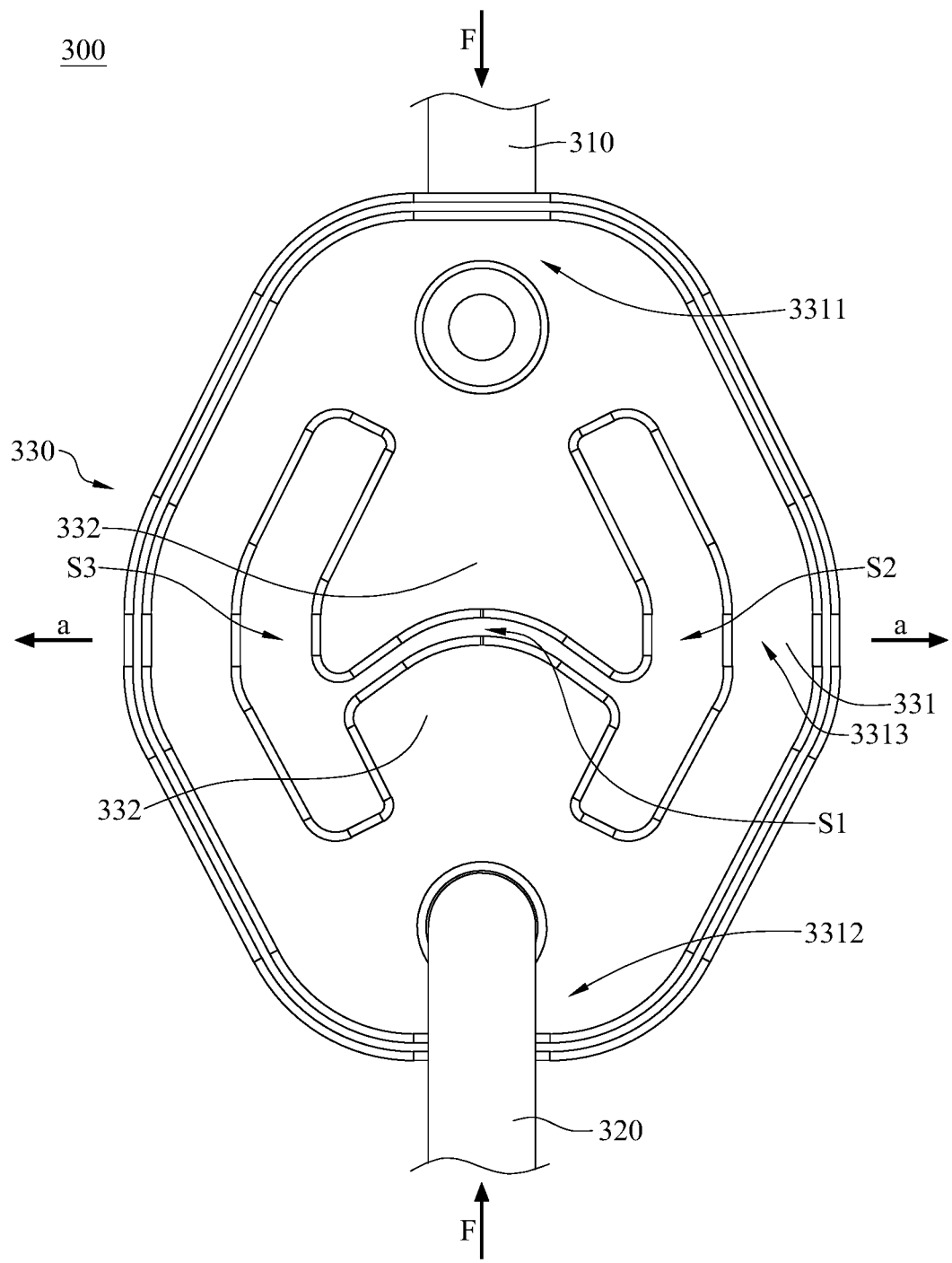
FIG. 4 is a planar view of the impact energy absorbing unit in FIG. 3 when being compressed.

Referring to FIGS. 3 and 4, FIG. 3 shows the planar view of the impact energy absorbing member 330 when there is no vibration or impact applied, and FIG. 4 shows that the impact energy absorbing unit 300 is compressed by force F.

In detail, as shown in FIG. 4, the impact energy absorbing member 330 is experiencing external force transferred from the first link 310 and the second link 320; that is, the impact energy absorbing member 330 is applied with force on opposite sides. This causes the periphery part 331 to deform and also causes the protrusion parts 332 to move towards each other. In more detail, the impact energy absorbing member 330 is compressed and deformed, as discussed above, the width difference between the side portions and middle portion of the periphery part 331 makes the opposite sides of the periphery part 331 easier to deform outwards (e.g., in directions A), and which forces the protrusion parts 332 to move closer. The above deformation of the periphery part 331 and the movement of the protrusion parts 332 can absorb and decrease the force F.

In this embodiment, the impact energy absorbing member 330 is made of a material suitable for in response to the impact and vibration of high frequency, and the shapes of the periphery part 331 and the protrusion parts 332 of the impact energy absorbing member 330 are suitable for in response to the impact and vibration of low frequency. As such, the impact energy absorbing carrier 10 can provide a comprehensive cushioning against impact and vibration in a large range of frequency.

In addition, the impact energy absorbing unit 300 not only provides cushioning against impact and vibration, but also is detachable from the frame 100 and the container 200, such that the container 200 and the battery placed thereon can be removed from the impact energy absorbing unit 300 and the frame 100, thereby facilitating the maintenance and the reuse of the battery and thus meet the eco-friendly requirement.

According to the impact energy absorbing carrier and the impact energy absorbing member as discussed above, the material and the structure of the impact energy absorbing member can provide a comprehensive cushioning against impact and vibration in a large range of frequency.

In addition, the impact energy absorbing unit is detachable from the frame and the container, such that the container and the battery placed thereon can be removed from the impact energy absorbing unit, thereby facilitating the maintenance and the reuse of the battery and thus meeting the eco-friendly requirement.

In one embodiment of the invention, the impact energy absorbing carrier and the impact energy absorbing member can be applied in a vehicle, such as a self-driving vehicle, an electric vehicle, or a semi-self-driving vehicle and so on.

It will be apparent to those skilled in the art that various modifications and variations can be made to the present invention. It is intended that the specification and examples be considered as exemplary embodiments only, with a scope of the invention being indicated by the following claims and their equivalents.

What is claimed is:

1. An impact energy absorbing carrier, configured for accommodating a battery, comprising:
   a frame;
   a container, configured for accommodating the battery; and
   a plurality of impact energy absorbing units, wherein the container is mounted on the frame via the plurality of impact energy absorbing units, and each of the plurality of impact energy absorbing units comprises:
   a first link, wherein an end of the first link is fixed to the frame;
   a second link, wherein an end of the second link is fixed to the container; and
   an impact energy absorbing member, comprising a periphery part and two protrusion parts, wherein the periphery part comprises a first side portion and a second side portion located opposite to each other, the first side portion of the periphery part is pivotably disposed on the first link, the second side portion of the periphery part is pivotably disposed on the second link, the periphery part surrounds the two protrusion parts, the two protrusion parts are respectively connected to the first side portion and the second side portion of the periphery part, and a first buffering space is located between the two protrusion parts.

2. The impact energy absorbing carrier according to claim 1, wherein each of the two protrusion parts comprises a first surface, the first surfaces face each other, the first buffering space is formed between the first surfaces, the first surfaces are curved surfaces mating with each other, and the first buffering space is in a curved shape.

3. The impact energy absorbing carrier according to claim 2, wherein each of the two protrusion parts further comprises a second surface and a third surface, the second surfaces of the two protrusion parts are spaced apart from the periphery part so as to form a second buffering space therebetween, and the third surfaces of the two protrusion parts are spaced apart from the periphery part so as to form a third buffering space therebetween.

4. The impact energy absorbing carrier according to claim 3, wherein the second buffering space and the third buffering space are in a curved shape.

5. The impact energy absorbing carrier according to claim 3, wherein portions of the protrusion parts respectively connected to the first side portion and the second side portion are narrower than another portions of the protrusion parts respectively located away from the first side portion and the second side portion.

6. The impact energy absorbing carrier according to claim 1, wherein each of the first side portion and the second side portion has a width smaller than a width of a middle portion of the periphery part.

7. An impact energy absorbing member, comprising:
   a periphery part, comprising a first side portion and a second side portion located opposite to each other; and
   two protrusion parts, wherein the periphery part surrounds the two protrusion parts, the two protrusion parts are respectively connected to the first side portion and the second side portion of the periphery part, and a first buffering space is located between the two protrusion parts.

8. The impact energy absorbing member according to claim 7, wherein each of the two protrusion parts comprises a first surface, the first surfaces face each other, the first buffering space is formed between the first surfaces, the first surfaces are curved surfaces mating with each other, and the first buffering space is in a curved shape.

9. The impact energy absorbing member according to claim 8, wherein each of the two protrusion parts further comprises a second surface and a third surface, the second surfaces of the two protrusion parts are spaced apart from the periphery part so as to form a second buffering space therebetween, and the third surfaces of the two protrusion parts are spaced apart from the periphery part so as to form a third buffering space therebetween.

10. The impact energy absorbing member according to claim 9, wherein the second buffering space and the third buffering space are in a curved shape, and each of the first side portion and the second side portion has a width smaller than a width of a middle portion of the periphery part.

* * * * *